United States Patent [19]

Epperly

[11] Patent Number: 4,932,505

[45] Date of Patent: Jun. 12, 1990

[54] ROLLER BODY FOR BRAKE SHOE ACTUATOR CAM

[75] Inventor: Harrison R. Epperly, Indianapolis, Ind.

[73] Assignee: Echlin Inc., Branford, Conn.

[21] Appl. No.: 812,755

[22] Filed: Dec. 23, 1985

[51] Int. Cl.[5] ............................................. F16D 65/22
[52] U.S. Cl. ..................................................... 188/330
[58] Field of Search .............. 188/324, 329, 330, 332, 188/338, 339, 250 A, 250 F; 72/108, 703; 74/569; 192/78; 384/548, 550, 565

[56] References Cited

U.S. PATENT DOCUMENTS

| | | | |
|---|---|---|---|
| 938,251 | 10/1909 | Latham | 384/565 |
| 2,378,261 | 6/1945 | Turney | 72/703 X |
| 2,819,632 | 1/1958 | Lyman | 72/703 X |
| 2,852,106 | 9/1958 | Cull, Jr. et al. | 188/330 |
| 3,894,620 | 7/1975 | Goldberg | 188/250 A X |
| 4,476,968 | 10/1984 | Urban et al. | 188/329 |

*Primary Examiner*—Duane A. Reger
*Attorney, Agent, or Firm*—Robert A. Spray

[57] ABSTRACT

A roller body for providing a brake shoe actuator, in a heavy-duty air brake assembly in which the braking effect is achieved by the movement of a cam which pushes on a brake shoe by rolling forcefully against the roller body which is revolvably carried by the brake shoe; and the roller body has a generally cylindrical surface which is provided with knurling grooves all running generally parallel to the axis of the body member, providing high torque and self-cleaning effect which gives smooth braking and extra gripping power by assuring smooth actuation of the brake shoe in response to the braking force applied to the cam shaft of the braking system.

8 Claims, 2 Drawing Sheets

ROLLER BODY FOR BRAKE SHOE ACTUATOR CAM

FIELD OF THE INVENTION

The present invention relates to braking systems, and more particularly to a heavy-duty air brake assembly, and even more particularly to a roller body which accepts the revolving movement of an actuator cam which forcefully engages the roller body in a braking effort, that forceful engagement of the roller body then being transmitted through the trunnion bearings of the roller body to forcefully push the brake shoe against the brake drum.

A typical heavy duty air brake assembly includes a cam shaft which is caused to revolve by the braking effort exerted by the user; and the actuator cam of such a system is typically of a sort of S-shape whose arms respectively engage one of the roller bodies for transmission of the braking effort to the brake shoe to force it to forcefully engage the brake drum.

The portions of the cam are carefully formed, particularly with respect to the distance from the axis of rotation of the cam shaft and cam, so that a gradually-increasing braking effort is achieved as the user applies a braking effort to cause a revolving turning of the brake's cam shaft, by the outward spiral-nature of the cam arms being very gradual and very smooth.

The roller body is thus a cam follower, having a generally cylindrical central portion, which has forceful but rolling contact with the arms of the brake cam, and on each end the roller body has a trunnion bearing which are respectively revolvably carried in bearing holes of a pair of ears carried at each end of the brake shoe.

Thus as the brake cam is caused to revolve, its arms apply a great force against the roller bodies, achieving a great force tending to enlarge the band-like brake shoe to forcefully engage the brake drum for the braking effect In braking mechanisms, especially for vehicles, the characteristics needed by such components of a brake system thus include long wear life, smoothness of action, and sureness and positiveness and consistency of braking effect, with each component contributing its own operativity toward the overall braking effort.

Prior Art:

The prior art provides a roller body, generally as described above; i.e., the prior art provides roller bodies each having a generally cylindrical central body portion which is a component rollingly but forcefully engaged by the actuator cam's respective arm, and trunnion bearings at each end, for accommodating the rolling response of the roller body and transmitting the braking force from the actuator cam to the brake shoe.

Any imperfection of the cylindrical surface, however, whether caused by imperfect original formation, or by a sliding with respect to the cam arm as may have been caused by unknown cause or causes, tends to become worse, perhaps because any "flat spot" of rolling surfaces tends to increase during operation as the cam would have a sliding rather than the desired rolling action in that area. This is not asserted to be a technically correct scientific explanation, and indeed it is hard to know for sure just what is a technically correct description; but with the factors of a desired rolling contact, and very high forces being transmitted, the above seems fairly probable as at least a general description of the problems and the nature of the malfunction particulars.

The prior art has long used a diamond-pattern knurl on the cylindrical central body, achieving some smoothness of response and of force transmission, particularly when the roller body is relatively new and clean, for the effect of original imperfections seems to be minimized by the knurling. At least the prior art has widely used the diamond-knurl concepts for these actuator roller surfaces.

Such diamond knurling, however, has disadvantages. It seems that the dirt and grime, which can get trapped in the knurling, causes an objectionable sliding on the smooth cam surface

THE INVENTION CONCEPTS SUMMARIZED:

The concepts are best and properly considered and appreciated when the special operational conditions of use and environment of a brake shoe assembly are kept in mind, in conjunction with the needed and desired characteristics of long car life, smoothness of action, and the braking effects mentioned herein.

According to the present concepts, the invention provides an operativity advantage over a diamond-knurled roller surface by providing a special knurling, i.e., the knurling being provided with grooves all running generally parallel to the axis of the roller body member.

This parallel-to-axis knurling gives advantages, some of which seem surprising. For one thing, it seems to be better in its torque-transmission, apparently having significantly more surface area of and for the forceful rolling contact with the actuator cam. It achieves a sort of self-cleaning effect, by providing channels open to each end of the contact portion. It seems to achieve even a ratchet effect, without damage to the cam surface. In the overall, it seems to provide extra gripping power, probably due in part to one or more of the above.

Thus, in considering the nature of the present invention when viewed with a hindsight comparison against the prior art, it is to be seen that although the construction and the construction details appear simple, the concepts themselves are a departure from the prior art, and the concepts have not been simple The review of representative prior art, which of course is a forerunner of the present invention, helps to emphasize the inventive nature of the present concepts, showing them unobvious even though in retrospect the construction may appear to be simple; for, instead of detracting from inventiveness, simplicity is regarded as often an element of inventiveness, especially where as here the successful concepts are a departure from prior art, and where the prior art has even used knurling patterns in order to try to achieve certain of the pluralistic advantages of the present concepts.

BRIEF DESCRIPTION OF THE DRAWINGS:

The above description is of somewhat introductory and generalized form. More particular details, concepts, and features are set forth in the following and more detailed description of an illustrative embodiment, taken in conjunction with the accompanying drawings, which are of somewhat schematic and diagrammatic nature, and in which.

Figure 1:
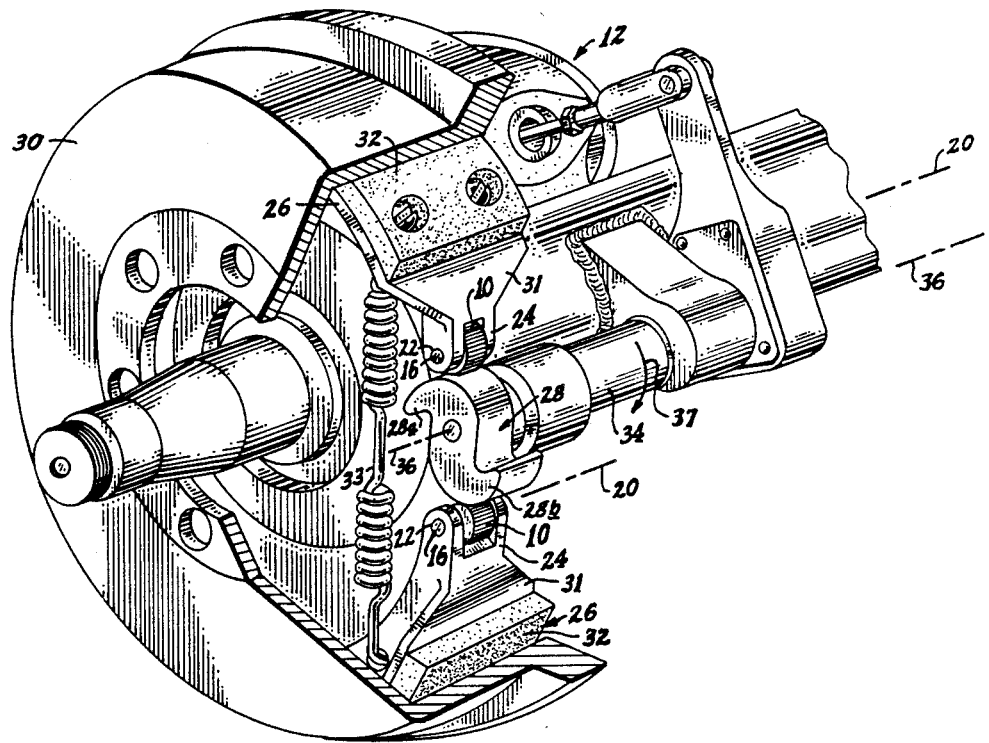
FIG. 1 is a pictorial view of a typical or conventional heavy duty air brake assembly, with foreground portions shown broken away, and showing a pair of cam follower rollers of the present invention installed therein, revolvably supported on respective end bodies of the assembly's brake shoe, and engaging the S-shaped actuator cam.

DESCRIPTION OF PREFERRED EMBODIMENT:

As shown in the drawings, there is provided an improved roller body 10 for providing a brake shoe actuator component. Particularly, as here illustrated, such a roller body 10 is used as an actuator or power-transmission component in a heavy-duty air brake assembly shown generally although somewhat schematically as indicated by reference numeral 12 (FIG. 1).

The roller body 10 is provided by a body member having a generally cylindrical surface 14 and having trunnion bearing members 16 extending from both ends 18 of the roller body's generally cylindrical surface 14.

As with roller bodies of the prior art, the generally cylindrical surface 14 and the end bearing members 16 of the roller body 10 are operatively co-axial along an axis 20 of the body member 10; and, in operation, each roller body 10 revolves about axis 20, with the roller end bearings 16 rotatably received in bearing holes 22 of ear-like supports 24 of the brake shoe 26, as the roller body 10 has revolving movement, as a cam follower, on the brake assembly's actuator cam 28, for forcing the assembly's brake shoe 26 against the associated brake drum 30 to achieve the braking action of the assembly 12. The support ears 24 are shown formed on end bodies 31 affixed to the respective ends of the brake shoe 26.

The brake assembly 12, itself a prior art device, is shown as a heavy duty air brake assembly 12, with the brake shoe 26 in the form of a circularly-disposed band whose outer surface 32 lies along but within the brake drum 30; and the braking operativity is achieved by whatever is the mechanism to cause the shoe 26 to expand outwardly against the brake drum 30, against the tension of a spring 33.

Figure 2:
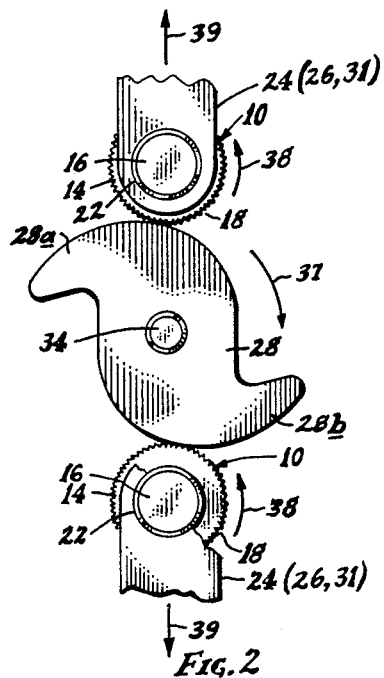
FIG. 2 is an enlarged detail view of the rollers and cam, as installed in the assembly, the view showing the rollers in end view.
Figure 3:
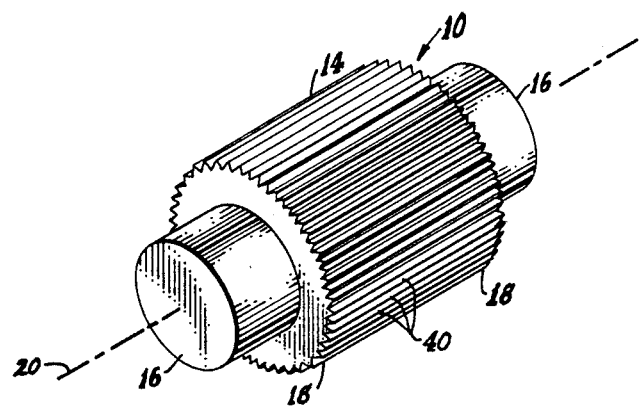
FIG. 3 is a further enlarged pictorial view of one of the preset invention's form of rollers.
Figure 4:
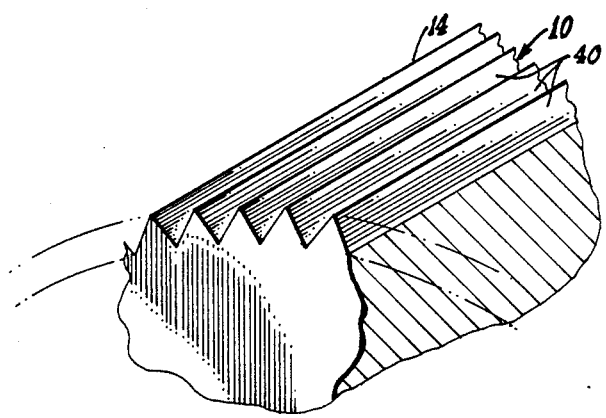
FIG. 4 is pictorial detail view, in further enlarged scale, of a portion of one of the rollers of the present invention.

That expansion of the brake shoe 26 against the brake drum 30 is shown as forced by rotation of the actuator cam 28 on cam shaft 34, each opposite arm 28a and 28b of the cam 28 having an outwardly spiraling nature and form, and each cam arm 28a and 28b pressing outwardly very forcefully against a respective cam follower roller 10 as the cam shaft 34 is caused to revolve by the user's braking effort. That brake actuation causes the cam shaft 34 to revolve about its axis 36, as indicated by the curved direction-arrow 37 in FIGS. 1 and 2, causing the rollers 10 to revolve as indicated by the curved direction-indication arrows 38 in FIG. 2, forcing outwardly the brake shoe support ears 24 as shown by direction arrows 39 (FIG. 2).

According to concepts of the present invention, the improvement over the prior art is quite a particularized and specific improvement, achieving the advantages as pointed out herein, even though from a construction standpoint the changes may not be viewed as significant unless, as is proper, the conceptual differences are considered against disadvantages of the prior art.

More particularly, and as shown, each roller body 10 is shown with its generally cylindrical surface 14 as provided with knurling grooves 40 all shown running generally parallel to the axis 20 of the body member 10

Desirably, the knurling grooves 40 are at a pitch of between 15 and 35 knurl grooves per lineal inch of the circumference of the roller body's generally cylindrical surface 14. The grooves 40 are thus horizontal in use, for the typical brake assembly carries the roller axis 20 horizontally, and the grooves 40 are parallel and parallel to the axis 20 as above noted; and it is further to be noted that the knurl grooves 40 are formed so as to fully open to both ends 18 of the roller body member 10.

These concepts of formation and operativity co-operate to achieve a sort of self-cleaning effect over knurling which either is not fully open at both ends or which is substantially longer, or which has a direction non-parallel to the roller body axis and thus non-horizontal.

Also desirably as shown, in a typical assembly 12 in which the assembly 12 utilizes a pair of brake shoe actuator roller bodies 10, such as the situation in a typical heavy duty air brake assembly 12 shown, each of the roller bodies 10 is provided according to this invention, i.e., as a body member which has knurling grooves 40 all of which run generally parallel to the body member axis 20 and are open at both ends 18 thereof.

SUMMARY:

It is thus seen that a roller body 10 for actuating a brake shoe in response to revolving movement of an actuator cam 28, having knurling 40 parallel to the roller body axis 20, provides an advantageous roller body in such a use and assembly providing an advantageous device when formed according to the inventive concepts Accordingly, it will thus be seen from the foregoing description of the invention according to this illustrative embodiment, considered with the accompanying drawings, that the present invention provides new and useful concepts, and utility from various standpoints such as pointed out herein, yielding desired advantages and characteristics and accomplishing the intended objects, including those hereinbefore pointed out and others which are inherent in the invention.

Modifications and variations may be effected without departing from the scope of the novel concepts of the invention; accordingly, the invention is not limited to the specific embodiment or form or arrangement of parts herein described or shown.

I claim:

1. A roller body for providing a brake shoe actuator for achieving braking action in a heavy-duty air brake assembly having associated therewith an actuator cam, a brake shoe, and brake drum, the roller body providing by a body member having a generally cylindrical surface and having bearing members extending from both ends of the generally cylindrical surface, the generally cylindrical surface and the bearing members being operatively co-axial along a longitudinal axis of the body member for its revolving movement on an associated actuator cam for forcing the assembly's brake shoe against the associated brake drum to achieve the braking action, the roller body being characterized by the generally cylindrical surface being provided with knurling grooves all running generally parallel to the axis of the body member.

2. A roller body as set forth in claim 1, in which the knurling grooves are at a pitch of between 15 and 35 knurling grooves per lineal inch of the circumference of the generally cylindrical surface of the roller body member.

3. A roller body as set forth in claim 1, in which the knurling grooves are formed so as to be fully open to both ends of the roller body member.

4. A roller body as set forth in claim 2, in which the knurling grooves are formed so as to be fully open to both ends of the roller body member.

5. A pair of brake shoe actuator roller bodies for a heavy duty air brake assembly, each of the roller bodies provided as a body member as set forth in claim 1.

6. A pair of brake shoe actuator roller bodies for a heavy duty air brake assembly, each of the roller bodies provided as a body member as set forth in claim 2.

7. A pair of brake shoe actuator roller bodies for a heavy duty air brake assembly, each of the roller bodies provided as a body member as set forth in claim 3.

8. A pair of brake shoe actuator roller bodies for a heavy duty air brake assembly, each of the roller bodies provided as a body member as set forth in claim 4.

* * * * *